(12) United States Patent
Engelbrecht et al.

(10) Patent No.: US 7,845,914 B2
(45) Date of Patent: Dec. 7, 2010

(54) SELF-PRIMING FAST FILL SPRAYER PUMP SYSTEM

(75) Inventors: Joshua Jacob Engelbrecht, Ankeny, IA (US); Kent Alvin Klemme, Eindhoven (NL)

(73) Assignee: Deere & Company, Moline, IL (US)

( * ) Notice: Subject to any disclaimer, the term of this patent is extended or adjusted under 35 U.S.C. 154(b) by 966 days.

(21) Appl. No.: 11/675,371

(22) Filed: Feb. 15, 2007

(65) Prior Publication Data
US 2008/0197207 A1  Aug. 21, 2008

(51) Int. Cl.
*F04B 23/14* (2006.01)
*F04B 49/24* (2006.01)
*B05B 9/00* (2006.01)
*B67D 7/70* (2010.01)

(52) U.S. Cl. .................... 417/203; 417/199.1; 417/287; 417/303; 239/127; 137/565.29

(58) Field of Classification Search ............... 417/2, 417/199.1, 199.2, 200, 201, 203, 287, 403; 237/127, 172; 137/565.29
See application file for complete search history.

(56) References Cited
U.S. PATENT DOCUMENTS

| 4,199,303 A * | 4/1980 | Gusmer et al. ............... 417/216 |
| 5,004,155 A * | 4/1991 | Dashevsky .................. 239/127 |
| 5,433,380 A * | 7/1995 | Hahn ........................ 239/62 |
| 5,911,362 A * | 6/1999 | Wood et al. .................. 239/1 |
| 7,192,961 B2 * | 3/2007 | Gaeta et al. ............. 514/252.11 |

\* cited by examiner

*Primary Examiner*—Charles G Freay

(57) ABSTRACT

A fast fill pump system for a self-propelled field sprayer includes high capacity centrifugal pump for tank filling. The centrifugal pump is connected in parallel with the fill connection and primed by a lower capacity diaphragm spraying pump. Two check valves and a pressure sensor allow the sprayer control to automatically control the pump priming and tank filling with the activation of one switch. The two-pump system preserves tank filling speed, even during operation of eductor or tank agitation functions. The centrifugal pump can be removed and the spraying pump operated to fill the tank without substantial base machine modification.

20 Claims, 1 Drawing Sheet

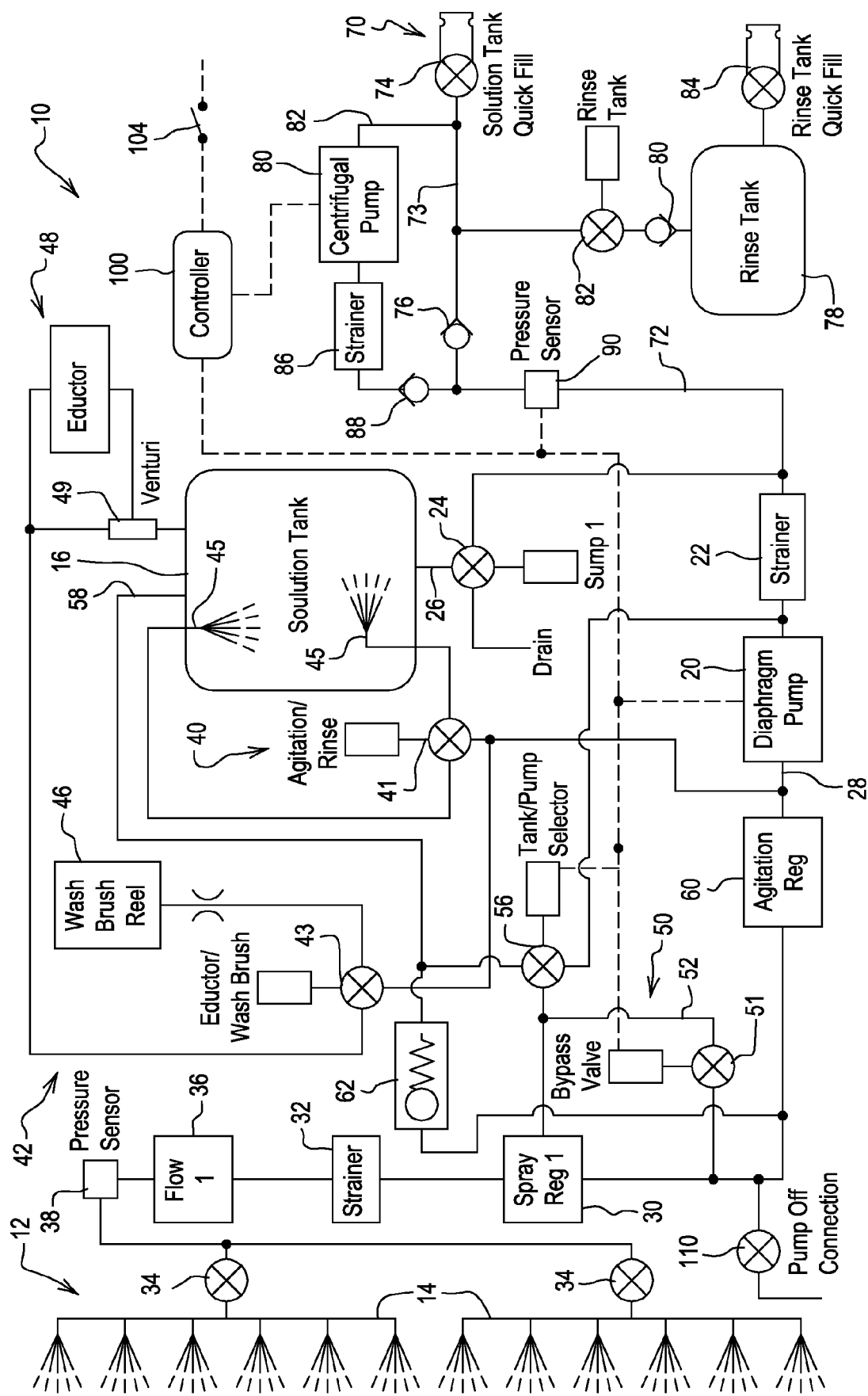

SELF-PRIMING FAST FILL SPRAYER PUMP SYSTEM

FIELD OF THE INVENTION

The present invention relates to self-priming fast fill pump system for an agricultural sprayer such as a self-propelled field sprayer.

BACKGROUND OF THE INVENTION

Sprayers, particularly in Europe, are often equipped with a diaphragm spray pump. The diaphragm pump is self-priming and can load water or chemical solution from an external source even when there is no head present. Self-priming is necessary, for example, when a tank is filled with water from a ditch, canal or other source that is lower than the sprayer pump. However, such self-priming pumps typically have flow rates on the order of 74 gal/min or less. Centrifugal pumps can achieve flow rates of 150-200 gal/min but must have positive head pressure so that the inlet of the pump is flooded. Therefore, use of the higher capacity centrifugal pump presents problems in situations where the source does not provide such a head pressure.

SUMMARY OF THE INVENTION

The present invention provides an auxiliary centrifugal pump to fill the sprayer, and uses the diaphragm spraying pump to prime the centrifugal pump. A unique parallel plumbing configuration effectively primes the centrifugal pump while preserving the original spraying and loading functionality of the base machine. Two check valves and a pressure sensor allow the sprayer control to automatically control the pump priming and tank filling with the activation of one switch. The parallel design also permits the auxiliary centrifugal pump to be added to a base machine with little or no disruption of original machine functionality and few hardware modifications. When the centrifugal pump is removed, the spraying pump provides the filling function. The two-pump system preserves tank filling speed, even during operation of eductor or tank agitation functions.

BRIEF DESCRIPTION OF THE DRAWINGS

FIG. 1 shows a schematic for a self-priming, fast fill sprayer system.

DESCRIPTION OF THE PREFERRED EMBODIMENT

Referring to FIG. 1, therein is shown a schematic for a sprayer system 10 for a field sprayer 12. The sprayer 12 includes sprayer nozzle sections 14 for applying material from a solution tank 16 to plants or the soil.

A sprayer pump 20 (pump 1) is connected through a strainer 22 and a control valve 24 to an outlet 26 of the solution tank 16. The pump 20 is a self-priming pump such as a diaphragm pump and has an outlet 28 connected through a spray regulator 30 and strainer 32 to sprayer section control valves 34. Flow and pressure signals are provided through flow and pressure transducers 36 and 38.

The output 28 of the pump 20 is also connected to an agitation and rinse assembly 40 through a control valve 41 and to an eductor and wash brush assembly 42 through a control valve 43. The valve 41 can be activated to direct pressurized fluid from the output 28 to agitation nozzles 45 within the solution tank 16. The valve 43 can be activated to selectively direct pressurized fluid from the pump output 28 to a wash brush system 46 and to an eductor 48 for adding chemical to fluid directed from the valve 43 through a venture 49 and into the solution tank 16.

A bypass circuit 50 includes a bypass valve 51 connected between the regulator 30 and the pump output 28 by a line 52. The line 52 is also connected to a selector valve 56. The valve 56 is also connected to a solution tank input 58. The output 28 of the pump 20 is connected through an agitation regulator 60 and a pressure responsive valve 62 to the tank input 58.

A fill system 70 is connected via line 72 to the input of the pump 22. A quick fill valved connector 74 is connected by a line 73 and a one-way check valve 76 to the line 72. A rinse tank 78 is connected through a one-way check valve 80 and a rinse tank valve 82 to the valve 76 downstream of the connector 74. A rinse tank quick fill valved connector 84 provides access for filling the tank 78 from a source of rinse fluid. The solution tank 16 can be filled using the self-priming pump 20, even from a source of fluid that lacks head pressure, by closing the spray valves 34 and directing fluid from the pump output 28 through the valve 62 to the tank input 58. However, use of the pump 20 for solution tank filling limits pumping rate and interferes with eductor and agitation functions.

To provide added fill pumping capacity while retaining the benefit of the self-priming feature, an auxiliary pump 80 is connected between the quick fill connector 74 and the line 72 in parallel with the line 73 and the check valve 76. The pump 80, which is shown as a high capacity centrifugal pump, includes an input 82 connected to the line 73 downstream of the connector 74, and an output connected through a strainer 86 and a one-way check valve 88 to the line 72. A pressure transducer 90 provides a signal indicative of the pressure in the line 72. The pumps 20 and 80 are driven in a conventional manner, such as by variable speed hydraulic motors.

A controller 100 is operably connected to the pumps 20 and 80, the bypass valve 51 and the tank/pump selector valve 56 and receives the pressure signal from the transducer 90. A controller switch 104 is closed to activate automatic control of solution tank filling when the connector 74 is in fluid communication with a source of fluid for the solution tank 16. The controller 100 may be a system controller for controlling sprayer functions in addition to the filling function. For example, the controller can also receive feedback from the various flow and pressure sensors to provide spray control for the spray nozzle system. The sensor 90 provides a signal to the controller 100 indicative of the centrifugal pump output pressure, and the controller 100 adjusts centrifugal pump speed in accordance with the signal. The signal from the sensor 90 also informs that controller 100 that a head is present at the pump 80 during initialization of the quick fill function.

To provide quick filling of the solution tank 16, the connector 74 attached to the source of filling fluid, and the controller 100 is activated to provide controlled filling. The controller 100 activates the self-priming pump 20 to draw fluid through the connector and the check valve 76 into the line 72 and provide a head at the pump input 82, even if the source of the filling fluid is below the input 82. Once primed, the centrifugal pump 80 draws filling fluid from the source through the connector 74. The pump 80 delivers the fluid through the strainer 86 and the check valve 88 to the line 72 and through the tank/pump selector valve 56. The controller 100 directs the valve 56 to open the line 72 to the solution tank input 58 so that the fluid from the pump 80 is delivered to the solution tank 16. The parallel design also permits the auxiliary centrifugal pump 80 to be added to a base machine with little or no disruption of original machine functionality and simple modification of the original plumbing. When the pump 80 is removed, the spraying pump 20 provides the filling function.

The pump 20 is operable independently of the auxiliary pump 80 to provide tank agitation and eductor functions. By directing fluid from the pump output 28 through the valve 41 to the nozzles 45, the solution in the tank 16 is agitated. To operate the eductor system, the valve 43 is turned to direct fluid through the venturi 49 and draw chemical from a container connected to the eductor 48 into the solution tank 16. The valve 43 can be positioned to provide fluid flow to the wash brush system 46. The regulator 60 maintains the pressure to the wash and eductor systems below a preselected level by selectively returning fluid to the tank 16 through the valve 62 and the tank input 58.

During normal sprayer operations, the valves 34 are opened, and the valve 24 opens the solution tank outlet 26 to the input of the pump 20 through the strainer 22. The spray solution is directed through the regulator 60 to the spray regulator 30 and out to the spray sections 14 through the corresponding valves 34. Excess solution is circulated back to the tank 16 through the valve 62 and inlet 58 and provides some agitation of the spray solution. If necessary, additional agitation can be provided during spraying operation by opening the agitation valve 41 to direct some spray solution from the pump outlet 28 to the nozzles 45.

To rinse the tank 16 between operations, a pump off valve connection 110 is opened to a storage tank (not shown), and excess solution in the tank 16 is pumped out by the pump 20. The valve 82 is turned to open the rinse tank 78 to the input of the pump 20. Pressurized rinse tank fluid is directed from the pump output 28 through the valve 41 and the nozzles 45 to rinse the inside walls of the tank 16. The valve 43 can be opened to direct fluid to the wash brush system 46.

Having described the preferred embodiment, it will become apparent that various modifications can be made without departing from the scope of the invention as defined in the accompanying claims.

The invention claimed is:

1. In a field sprayer having a filling connection, a line feeding a solution tank from the filling connection, and a self-priming pump of first flow rate connected to the solution tank and to a spray nozzle system for applying liquid from the solution tank, an auxiliary fill system including an auxiliary pump having a flow rate higher than the first flow rate connected to the solution tank and to the line feeding the solution tank from the filling connection, the self-priming pump connected to the auxiliary pump thereby providing priming of the auxiliary pump, wherein the self-priming pump comprises a diaphragm pump and the auxiliary pump comprises a centrifugal pump.

2. The field sprayer having an auxiliary fill system as set forth in claim 1 wherein the self-priming pump is connected through a check valve to the filling connection and to input of the centrifugal pump.

3. The field sprayer having an auxiliary fill system as set forth in claim 1 including bypass structure connected to the auxiliary fill system and the self-priming pump for bypassing the auxiliary pump, whereby the self-priming pump is operable without the auxiliary pump to provide solution tank filling.

4. The field sprayer having an auxiliary fill system as set forth in claim 3 including a solution tank fill inlet connected to the input of the auxiliary pump and to the input of the self-priming pump.

5. In a field sprayer having a filling connection opening to a supply of spray fluid and a line feeding a solution tank from the filling connection, and a self-priming pump of first flow rate connected to the solution tank and to a spray nozzle system for applying liquid from the solution tank, an auxiliary fill system including an auxiliary pump having a flow rate higher than the first flow rate connected to the solution tank and the filling connection, wherein the auxiliary pump includes an outlet connected via a one-way check valve opening towards an inlet of the self-priming pump, the auxiliary pump having a fill inlet connected to the supply of spray fluid and to the inlet of the self-priming pump through a second check valve and a pressure sensor, the self-priming pump drawing solution from the filling tank connection to the inlet of the auxiliary pump and providing priming of the auxiliary pump.

6. In a field sprayer having a filling connection feeding a solution tank from the filling connection, and a self-priming pump of first flow rate connected to the solution tank and to a spray nozzle system for applying liquid from the solution tank, an auxiliary fill system including an auxiliary pump having a flow rate higher than the first flow rate connected to the solution tank and to the filling connection, the self-priming pump connected to the auxiliary pump, and further comprising a controller connected to the auxiliary fill system and to the self-priming pump, the controller providing a controlled primer function for the auxiliary pump through the self-priming pump.

7. The field sprayer having an auxiliary fill system as set forth in claim 6 wherein the controller comprises a spray controller for the spray nozzle system.

8. The field sprayer having an auxiliary fill system as set forth in claim 6 further comprising an eductor connected to the self-priming pump and operable independently of the auxiliary pump.

9. The field sprayer having an auxiliary fill system as set forth in claim 6 further comprising an agitation rinse system connected to the self-priming pump and operable independently of the auxiliary pump.

10. The field sprayer having an auxiliary fill system as set forth in claim 9 wherein the agitation rinse system is operable during operation of the auxiliary pump, the auxiliary pump maintaining a selected flow rate independently of operation of the agitation rinse system.

11. In a field sprayer having a filling connection feeding a solution tank, and a self-priming pump connected to the solution tank and to a spray nozzle system for applying liquid from the solution tank, an auxiliary fill system including an auxiliary pump connected to the solution tank and the filling connection, the self-priming pump providing priming of the auxiliary pump, and bypass structure connected to the filling connection and the self-priming pump to define a fluid flow path from the filling connection through the self-priming pump to the solution tank so that the self-priming pump is operable to provide solution tank filling from the filling connection independently of the auxiliary pump.

12. The field sprayer having an auxiliary fill system as set forth in claim 11 wherein the self-priming pump comprises a diaphragm pump and the auxiliary pump comprises a centrifugal pump.

13. The field sprayer having an auxiliary fill system as set forth in claim 11 wherein the auxiliary pump includes an outlet connected via a one-way check valve opening towards an inlet of the self-priming pump, the auxiliary pump having a fill inlet connected to the filling tank connection and to the inlet of the self-priming pump through a second check valve and a pressure sensor, the self-priming pump drawing solution from the filling tank connection to the inlet of the auxiliary pump.

14. The field sprayer having an auxiliary fill system as set forth in claim 11 further comprising a controller connected to the auxiliary fill system and to the self-priming pump, the controller providing a controlled primer function for the auxiliary pump through the self-priming pump.

15. The field sprayer having an auxiliary fill system as set forth in claim 14 wherein the controller comprises a spray controller for the spray nozzle system.

16. The field sprayer having an auxiliary fill system as set forth in claim 14 further comprising an eductor connected to the self-priming pump.

17. The field sprayer having an auxiliary fill system as set forth in claim 14 further comprising an agitation rinse system connected to the self-priming pump.

18. The field sprayer having an auxiliary fill system as set forth in claim 17 wherein the agitation rinse system is operable during operation of the auxiliary pump, the auxiliary pump maintaining a selected flow rate independently of operation of the agitation rinse system.

19. The field sprayer having an auxiliary fill system as set forth in claim 18 wherein the self-priming pump has a pump output rate and wherein the selected flow rate is greater than the pump output rate.

20. The field sprayer having an auxiliary fill system as set forth in claim 19 including a solution tank fill inlet connected to the input of the auxiliary pump and to the input of the self-priming pump.

\* \* \* \* \*